(12) United States Patent
Jain et al.

(10) Patent No.: US 8,225,119 B2
(45) Date of Patent: Jul. 17, 2012

(54) ENERGY-AWARE SERVER MANAGEMENT

(75) Inventors: Navendu Jain, Redmond, WA (US);
Charles J. Williams, Bothell, WA (US);
James Larus, Mercer Island, WA (US);
Dan Reed, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 12/391,188

(22) Filed: Feb. 23, 2009

(65) Prior Publication Data
US 2010/0218005 A1 Aug. 26, 2010

(51) Int. Cl.
*G06F 1/32* (2006.01)
*G06F 1/26* (2006.01)

(52) U.S. Cl. ......... 713/320; 713/323; 713/324; 713/330

(58) Field of Classification Search .................... 713/300
See application file for complete search history.

(56) References Cited

U.S. PATENT DOCUMENTS

| | | | | |
|---|---|---|---|---|
| 6,795,928 | B2* | 9/2004 | Bradley et al. | 713/320 |
| 7,379,884 | B2* | 5/2008 | Barsness et al. | 705/63 |
| 7,484,111 | B2 | 1/2009 | Fung | |
| 7,606,719 | B2* | 10/2009 | Barsness et al. | 705/1.1 |
| 7,797,563 | B1* | 9/2010 | Moll et al. | 713/324 |
| 2002/0004913 | A1 | 1/2002 | Fung | |
| 2003/0115495 | A1* | 6/2003 | Rawson, III | 713/324 |
| 2003/0196126 | A1 | 10/2003 | Fung | |
| 2005/0132051 | A1* | 6/2005 | Hill et al. | 709/226 |
| 2006/0184287 | A1* | 8/2006 | Belady et al. | 700/291 |
| 2007/0049133 | A1 | 3/2007 | Conroy et al. | |
| 2007/0130341 | A1* | 6/2007 | Ma | 709/226 |
| 2008/0072090 | A1 | 3/2008 | O'Connor et al. | |
| 2008/0141048 | A1 | 6/2008 | Palmer et al. | |
| 2008/0201720 | A1 | 8/2008 | Betzler et al. | |
| 2009/0106571 | A1* | 4/2009 | Low et al. | 713/310 |
| 2009/0271046 | A1* | 10/2009 | Lewis et al. | 700/291 |
| 2010/0037038 | A1* | 2/2010 | Bieswanger et al. | 712/220 |

OTHER PUBLICATIONS

"International Search Report", Mailed Date: Sep. 30, 2010, Application No. PCT/US2010/023253, Filed Date: Feb. 4, 2010, pp. 9.
Chen, et al., "Energy-Aware Server Provisioning and Load Dispatching for Connection-Intensive Internet Services", Retrieved at <<http://research.microsoft.com/en-us/um/people/zhao/pubs/nsdi08_xiao.pdf>>, 5th USENIX Symposium on Networked Systems Design {\&} Implementation, NSDI, Apr. 16-18, 2008, pp. 1-14.
Iranli, et al., "System-Level Power Management: An Overview", Retrieved at <<http://atrak.usc.edu/~massoud/Papers/SPM-overview-VLSI-handbook.pdf>>, in the VLSI Handbook Second Edition, Dec. 2006, pp. 1-22.
Bianchini, et al., "Power and Energy Management for Server Systems", Retrieved at <<http://www.cs.rutgers.edu/~ricardob/papers/computer04.pdf>>, Computer, vol. 37, No. 11, Nov. 2004, pp. 1-11.
Urgaonkar, et al., "Dynamic Provisioning of Multi-tier Internet Applications", Retrieved at <<http://csl.cse.psu.edu/publications/ICAC05.pdf>>, In Proceedings of the 2nd International Conference on Autonomic Computing, 2005, pp. 1-12.

(Continued)

*Primary Examiner* — Ryan Stiglic (57) ABSTRACT

The described implementations relate to energy-aware server management. One implementation involves an adaptive control unit configured to manage energy usage in a server farm by transitioning individual servers between active and inactive states while maintaining response times for the server farm at a predefined level.

18 Claims, 5 Drawing Sheets

OTHER PUBLICATIONS

Fan, X. et al.; "Power Provisioning for a Warehouse-sized Computer"; Proceedings of the ACM International Symposium on Computer Architecture; San Diego, Currently Amended; Jun. 2007.

Felter, W. et al.; "A Performance-Conserving Approach for Reducing Peak Power Consumption in Server Systems"; ICS 2005; Jun. 2005.

Wang, Z. et al.; "Feedback Control Algorithms for Power Management of Servers"; Third International Workshop on Feedback Control Implementation and Design in Computing Systems and Networks (FeBID); Annapolis, MD; Jun. 2008.

* cited by examiner

ENERGY-AWARE SERVER MANAGEMENT

BACKGROUND

Data centers often contain a vast number of computers (i.e., servers). Many of these servers are temporarily underutilized or even unused, but are maintained to handle surges in requests arriving at the data center. For example, consider the Christmas rush at online shopping sites or the late afternoon congestion at a commuter traffic information site. The servers currently used in data centers consume a large amount of energy even when they are idle (for some servers, idle is 70% of full energy usage). Turning these servers off could save energy, but it also could adversely affect the response time of a web service if a surge of customers arrive and not enough servers are powered on. The present concepts can manage data centers in a manner that satisfies request service response times while considering energy usage of the data center.

SUMMARY

The described implementations relate to energy-aware server management. More specifically, the patent application relates to tools for energy-aware provisioning and load dispatching for request/response services.

One implementation involves an adaptive control unit configured to manage energy usage in a server farm by transitioning individual servers between active and inactive states while maintaining response times for the server farm at a predefined level. For instance, the predefined level may be defined in a service level agreement (SLA).

In another implementation a tool predicts future workload for a set of computers. Individual computers have at least two energy states, such as on/active, sleep and off. The tool formulates an energy-aware server management policy for the predicted future workload and adjusts energy states of individual computers based upon the energy-aware server management policy.

The term "tool(s)" may, for instance, refer to device(s), system(s), computer-readable instructions (e.g., one or more computer-readable media having executable instructions), component(s), module(s), and/or methods as permitted by the context above and throughout the document. In various instances, tools may be implemented as hardware, software, firmware, or combination thereof. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent application relates to energy-aware server management. Briefly, the patent describes concepts for operating a set of computers, such as a server farm at an expected performance level while reducing energy consumption.

The present concepts can employ multi-state servers in a server farm that responds to user-requests or "requests". When viewed collectively, the requests can be thought of as a "workload" of the server farm. Multi-state servers can have an active-state(s) where requests can be processed and an inactive-state which does not process requests. Some multistate computers can have multiple inactive states. For example, sleep, hibernate and/or off can be examples of inactive states. Servers in inactive states can use substantially less energy than active state servers. However, there can be a latency period of, for example, several seconds to several minutes involved in transitioning an inactive-state server to an active-state. This latency period can produce unwanted processing delay(s) before additional servers are available (i.e., active) to process the requests.

Accordingly, energy-aware server management can consider or balance several parameters, such as latency and performance criteria to reduce energy usage while still responding to the requests in a timely fashion.

Figure 1:
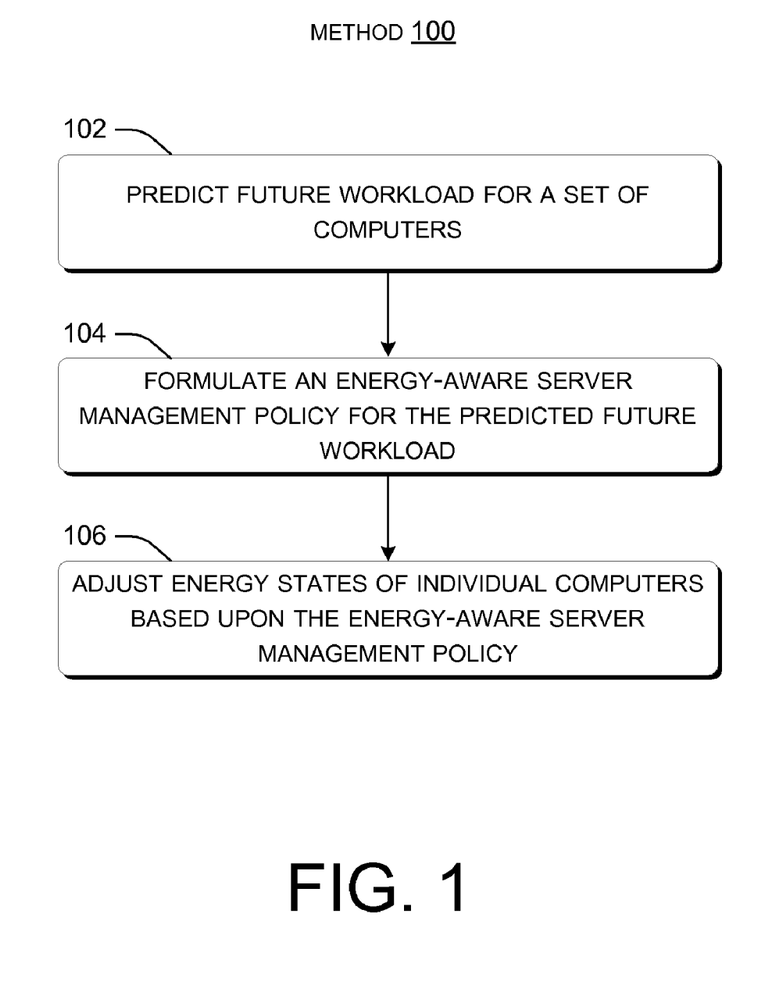
FIG. 1 shows an example of a method for implementing energy-aware server management concepts in accordance with some implementations of the present concepts.

FIG. 1 offers an introductory example of some of the present concepts in the form of a method 100. In this case, future workload for a set of computers, such as server computers is predicted or estimated at 102. The prediction can relate to a relatively short period of time such as a few seconds to a few minutes. In this particular case, individual computers can have two or more energy states. For instance, the computers can have an active-state (i.e., on) and one or more inactive states (i.e., off, sleep and hibernate, among others).

A detailed example of a workload prediction method is described below under the heading "workload prediction example". Briefly, in some instances, workload prediction can utilize relatively long term modeling, relatively short term history, present trends, and/or external knowledge (e.g., business projections, scheduled events), among others as parameters considered in the workload prediction process.

Long term modeling can look at workload trends relative to time of day, days of weeks, time of year, multi-year cycles such as elections, etc. For instance, there may be a consistent workload demand each weekday morning between eight and nine as workers arrive at work and make various personal and/or work related requests as they begin their day.

Short term history can relate to user request levels for the last few seconds or minutes. For instance, a mention of a web-site on a popular TV show may drive hits to that web-site for the next several minutes. Indications of upward trends in the last few seconds or minutes can be useful in predicting future requests for the next several seconds or minutes.

Present trends can relate to user requests that are received during the workload prediction process. For instance, present trends can be derived from the shape of a graph of requests over recently available times. The graph might be steady or might be changing in a time-series distribution (e.g., linear, exponential).

External information can be thought of as information that is not obtained from current or past requests. Instead, external information, may, for example, relate to an upcoming event that may not be represented in the past data. For instance, external information can convey that the Olympics are upcoming and that unusually high request numbers may be experienced during the duration of the Olympics as users try to download videos from the events.

Alternatively or additionally to request numbers, the external information can relate to request size. For instance, continuing with the above example, the external information may indicate that the number of requests may go up during the Olympics and that the size of each request may be larger than normal since the requests tend to relate to downloading video which is data intensive.

The above description provides non-limiting workload prediction examples. Other examples may predict request size. The predicted request size which can then be utilized in workload prediction. In summary, there are potentially many ways to predict future workload. The predicted future workload can then be utilized in the systems/methods described below, among others.

An energy-aware server management policy can be determined for the predicted workload at 104. Briefly, the energy-aware server management policy can include capacity provisioning. In some implementations capacity provisioning can be thought of as being proactive (i.e., proactive capacity provisioning) in that it can done in an online, real-time manner as workload changes. Proactive capacity provisioning can also be thought of as being proactive, in that it can be done proactively to mask the time taken by servers to transition between different power states. This can be contrasted with reactive decision making where the decision and any responsive action are done "after" an event has taken place.

Stated another way, a set of computers in their present states have a capacity to handle a given workload. If the capacity of the computers in their present state is different than a capacity for handling the predicted workload, then capacity provisioning can be employed to adjust the states of some of the computers to align the future capacity with the predicted workload.

The energy-aware server management policy can include changing the state of one or more of the computers (i.e., transitioning from an active state to an inactive state or vice-versa). The energy-aware server management policy can balance multiple factors, including but not limited to energy usage of the set of computers, timeliness expectations for responding to user requests, a confidence of the prediction/estimation, and/or effects on an expected service life of individual computers associated with state transitions. These factors are described in more detail below under the heading "capacity provisioning example".

Energy states of individual computers can be adjusted based upon the energy-aware server management policy at 106. For instance, some computers can be transitioned from active to inactive states to conserve energy. The energy-aware server management policy can also specify how requests are allocated between the active state computers.

Another aspect of the energy-aware server management policy can specify what state specific computers should be in. This might be done to improve the reliability of the computers. For example, some types of computers may experience negative long term consequences if they are transitioned between active and inactive states too many times. So the energy-aware server management policy can indicate that an individual server should not be transitioned more that a given number of times in a given time period, such as a day. The system can keep track of how many times 'machine A' has been cycled and choose a different machine to transition if machine A has been cycled too often. Various aspects of the energy-aware server management policy will be discussed in more detail relative to FIG. 2 and under the heading "state transitioning example".

Example of a System Configuration

Figure 2:
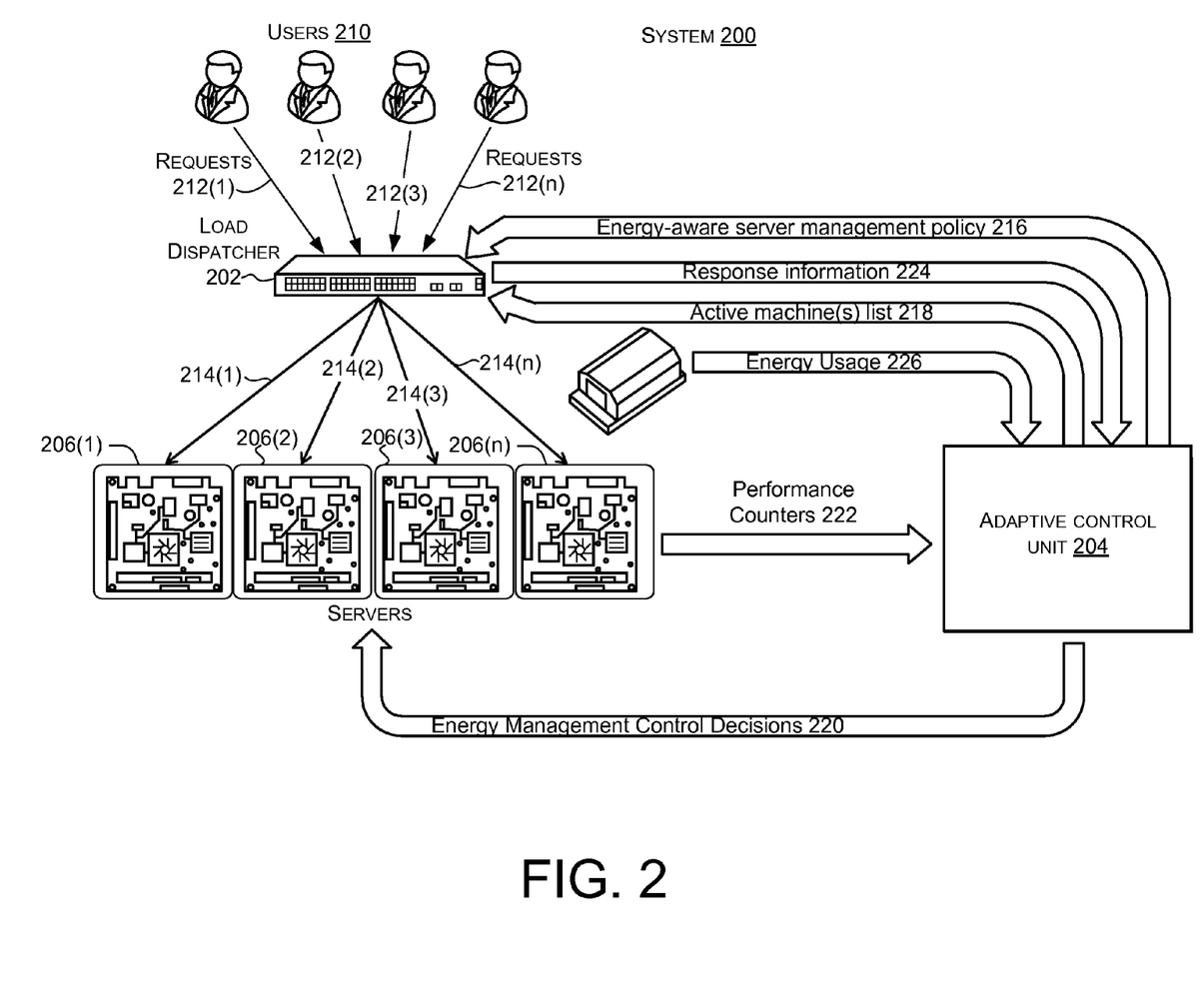
FIG. 2 illustrates an example of a system for accomplishing energy-aware server management in accordance with some implementations of the present concepts.

FIG. 2 shows a system 200 that is but one example upon which the above mentioned energy-aware server management can be implemented. In this case, system 200 includes a load dispatcher 202, an adaptive control unit 204, and a set of four servers 206(1), 206(2), 206(3), and 206(n). The load dispatcher 202, adaptive control unit 204, and servers 206(1), 206(2), 206(3), and 206(n) may be collocated and/or distributed from one another in various implementations.

Users, indicated generally at 210, can make requests 212(1)-212(n) that are received by load dispatcher 202. The load dispatcher sends individual requests 212(1)-212(n) to individual servers 206(1)-206(n) as indicated at 214(1)-214(n) according to an energy-aware server management policy 216 and an active machines list 218. The energy-aware server management policy 216 and active machines list 218 are generated by the adaptive control unit 204 and sent to the load dispatcher 202.

The active machines list 218 reflects energy management control decisions 220 conveyed to the servers 206(1)-206(n) by the adaptive control unit 204. The energy management control decisions can be thought of as controls that implement the energy-aware server management policy at the server level by controlling the states of individual servers 206(1)-206(n). The adaptive control unit 204 generates the energy-aware server management policy 216 and the active machines list 218 based upon various input parameters. In this instance, the input parameters include, but are not limited to performance counters 222, request information 224, energy usage 226, and/or input request workload (not specifically shown).

The performance counters 222 can be sent to the adaptive control unit 204 from the servers 206(1)-206(n). The performance counters can indicate the capacity at which individual servers and/or the collective set of servers are operating.

The request information 224, such as response times, can be obtained from the load dispatcher 202. Request information can be manifested in several ways, such as rate of requests (i.e., requests per unit time), request size, and/or request response times, among others.

Energy usage 226 can be obtained from various sources, with one simple source being an energy consumption meter on a power supply (not shown) to the servers 206(1)-206(n). While not specifically shown, other implementations may provide energy usage for individual servers, alone or in combination with, an overall energy usage. The adaptive control unit can also receive information for sources that are not specifically shown. For instance, the adaptive control unit can obtain performance information defined in a service level agreement (SLA). This performance information can be utilized in formulation of the energy-aware server management policy 216. Further, the adaptive control unit may only send specific parts of the energy-aware server management policy 216 to the load dispatcher 202. For example, the energy-aware server management policy can include dispatch logic that is sent to the load dispatcher to define how requests are dispatched to the servers.

In some instances, load dispatcher 202 can function as a load balancer and evenly distribute requests 212(1)-212(n) to the active servers 206(1)-206(n). In other instances, in relation to the active servers, the load dispatcher may strategically distribute requests to a sub-set of the active servers at a relatively high frequency to keep those servers at a specific capacity, say for instance 70% of total capacity. Any requests that would cause the sub-set of servers to exceed the specific capacity can be sent to a second sub-set of active servers. Such a configuration can keep a majority of the active servers operating at a specified or desired capacity while operating the second sub-set in a reserve role thereby improving energy efficiency. Viewed from one perspective this second sub-set of active servers can be thought as a hedge against unexpected workload spikes.

Further, based upon information obtained from the adaptive control unit 204 (i.e., energy-aware server management policy 216 and/or active machine list 218), the load dispatcher 202 can redistribute load away from any servers that are transitioning to an inactive state.

To summarize, in some implementations load dispatcher 202 can distribute requests among only the active servers and can redistribute requests away from servers being transitioned to inactive states.

In the illustrated configuration of system 200, adaptive control unit 204 can predict future workflow (i.e., future requests). The adaptive control unit can formulate the energy-aware server management policy to handle the future workload in an energy efficient manner. The adaptive control unit can consider multiple parameters in formulating the energy-aware server management policy. These parameters can include, but are not limited to request information 224, energy usage 226, and/or performance counters 222.

To summarize, the adaptive control unit 204 can control the state of the servers 206(1)-206(n) according to the energy-aware server management policy via the energy management control decisions 220. In the illustrated configuration, the adaptive control unit can function in a relatively simple closed-loop control scenario in that it can control system functions via output that is generated based upon the received input.

The adaptive control unit works by receiving input data relating to system performance, such as server central processor unit (CPU) utilization, request response time, and energy consumption to name a few. The input data can be considered in light of predicted future workload to determine how to handle the predicted future workload. For instance, the number of servers in each energy state (i.e., active, inactive (sleep, hibernate, off, etc)) can be adjusted to balance capacity with predicted workload and thereby save energy. Stated another way, the adaptive control unit can provision energy states among the servers 206(1)-206(n) in order to handle the predicted workload in an energy efficient manner.

In some cases, the servers 206(1)-206(n) can employ processors that were designed for non-server related uses. For instance, the present concepts can allow processors designed for use in netbooks and other mobile applications to be advantageously applied in server scenarios. For example, Intel brand's Atom processors can be utilized in some of the present configurations. The Atom processors are relatively energy efficient in the active state and have inactive sleep states that offer approximately a 90% energy savings over the active state.

Inactive states generally offer different latency times for transitioning to the active state. For instance, a true 'off' state may offer upwards of 99% power savings over an active state. However, the substantial energy savings come at a cost of relatively long transition latency. For instance, transition latency from the off inactive state to the active state may be several minutes. In comparison, a 'sleep' inactive state may offer, say for instance, 90% energy savings, but a transition latency of say, for instance, 10-20 seconds. The potential downside of such a long transition is that if the workload prediction actually underestimates the future workload, then a server that is off will be unavailable to help for a relatively long time.

The inactive state of 'hibernate' may offer an energy savings and transition latencies between the sleep and off inactive states. For instance, hibernate may offer a 95% energy savings compared to the active state and a 30 second latency transition. Note that in some characterizations, hibernate is characterized as a deep level of sleep. In relation to Intel's Atom processor mentioned above, active state energy consumption is 28-34 watts, but in the sleep state it consumes 3-4 watts and hibernate consumers 1-2 watts, both of which offer at least a ten-fold reduction in the energy consumption of idle processors. The inactive state examples described above are provided for discussion purposes. It should be understood that the present concepts are not tied to a particular set of inactive states that may be offered with particular server computers. Stated another way, the energy saving functionality can be applied to any system, device, and/or component that can be powered down and/or powered off.

Computers that have multiple inactive states tend to be available in some product lines, such as notebook computers. The product lines that offer multiple inactive states tend to be designed for freestanding applications, such as personal use, rather than coordinated applications such as a server farm. One reason for the lack of these features in coordinated applications is the complexity/difficulty of controlling the various computers in a manner that is both performant and energy efficient.

The complexity of balancing performance and energy efficiency is even borne-out in the single use scenarios. For instance, notebook computers are simply powered down to an inactive state if they time out (i.e., if no user input is received for a predefined period of time). The time out solution does not in any way attempt to predict future use and operate the computer in a manner that satisfies that future use in an energy conscious manner or is performant to the user. Thus, when a user returns to such a computer that has transitioned to an inactive state, the user has to provide some input and wait while the computer transitions back to the active state.

Energy-aware server management policy 216 can allow the energy efficiency potential of multistate computers to be realized in a collective setting such as a server farm. Briefly, energy-aware server management can determine when to transition individual servers 206(1)-206(n) between an inactive state and the active state to service present and predicted future workload.

Figure 3:
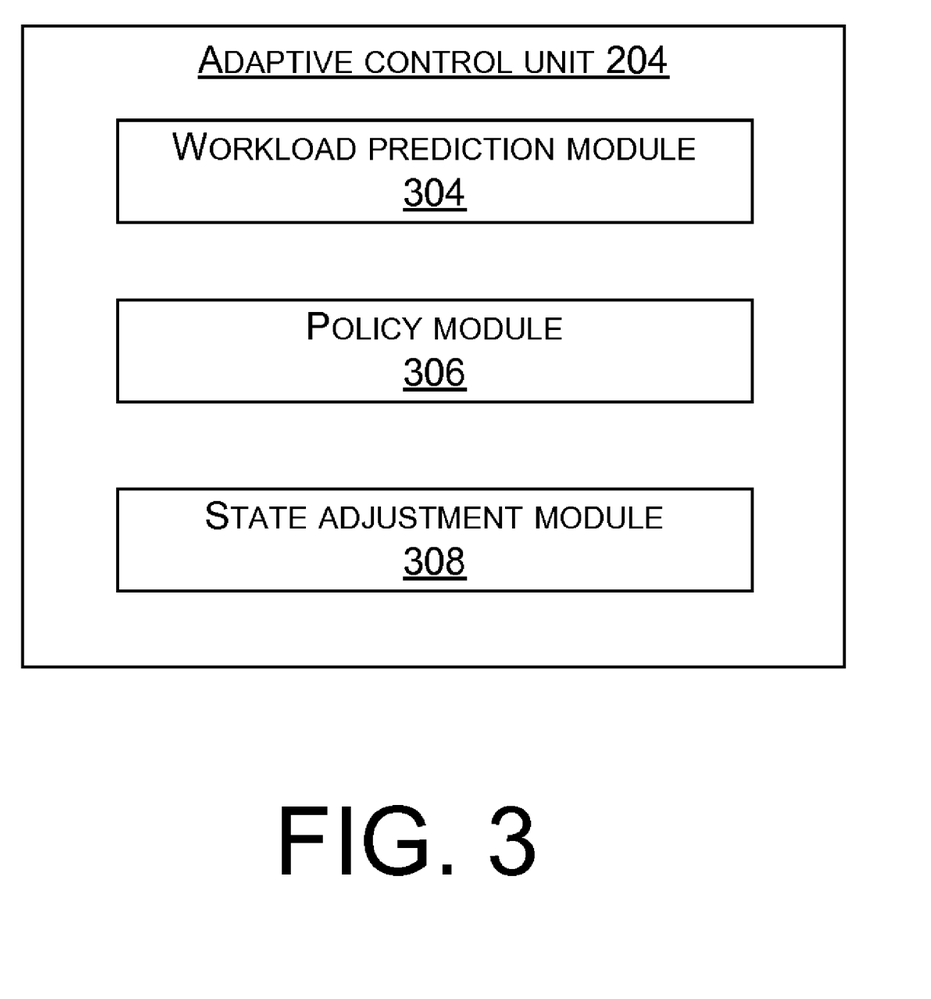
FIG. 3 illustrates an example of components for accomplishing energy-aware server management in accordance with some implementations of the present concepts.

FIG. 3 shows an example of logic modules of adaptive control unit 204 for accomplishing energy-aware server management. In this case, the logic modules are manifested as a workload prediction module 304, a strategy or policy module 306, and a state adjustment module 308.

The workload prediction module 304 can determine current workload and predict future workload. From one perspective, workload can be thought of as the number of requests per unit time multiplied by the size of the requests. In operating scenarios that involve relatively large numbers of requests an average request size can be calculated with a fairly high degree of accuracy. In those cases, the workload can simply be calculated as the number of requests per unit time multiplied by the average request size. The workload prediction module can predict future workload utilizing various techniques, some of which are introduced above and some of which are discussed below in more detail below. Briefly, in the system of FIG. 2, the workload prediction module 304 can utilize request information 224 as input data for predicting future workload. In other instances, the workload prediction module can receive and utilize external information. In some implementations, the workload prediction module can gather, model and store long term historic trends for use in estimating or predicting future workload.

Policy module 306 can formulate an energy-aware server management policy for satisfying the workload prediction supplied by the workload prediction module 304. For instance, the policy module can calculate present capacity as a number of active servers and the number of requests that can be handled by an individual active server per unit time. The policy module can calculate the appropriate capacity for the predicted workload. To summarize, the energy-aware server management policy can include capacity provisioning to handle the predicted workload.

The policy module 306 can formulate an energy-aware server management policy for reconfiguring the servers from the present configuration to the appropriate capacity for the predicted workload. For instance, consider a hypothetical scenario involving a server farm of 10 servers where each active server can handle 10 requests per second. The present workload is 67 requests per second that are being handled by 7 active servers (the remaining three servers are inactive). The workload prediction indicates that at future time t+Δt the workload will be 38 requests per second. In that case, the policy module can formulate an energy-aware server management policy that reduces the number of active servers.

The policy module 306 can include multiple factors in a cost benefit analysis when formulating the energy-aware server management policy. For instance, the policy module may consider how many times individual servers are being activated and inactivated in order to optimize server lifetimes. A server's lifetime tends to be inversely proportional to the number of transitions between active and inactive energy states. Another factor can be an SLA that defines performance levels for system 200. Another factor that can be considered is a confidence level in the workload prediction. For example, in an instance where the confidence level is high, then the policy module may conclude that four active servers will be sufficient for the predicted workload and include inactivating three more servers for a total of six inactive servers. If the confidence level is low, the policy module may formulate an energy-aware server management policy that maintains five active servers.

In some implementations, the policy module 306 can employ a performance learning model that can include different parameters or metrics such as CPU, memory, disk, network, etc. in formulating energy-aware server management policy. Further, for ease of explanation, the above discussion has treated all of the servers the same. However, the policy module can formulate an energy-aware server management policy 216 that recognizes and/or addresses differences or heterogeneity between servers. The differences may be internal and/or external to the servers. For instance, the energy-aware server management policy can reflect that individual servers have different capacity, different power footprints, and different transition times between energy states. Similarly, the servers may be affected by external factors, such as temperature hot-spots, repair and maintenance tasks.

The energy-aware server management policy can also specify to which inactive states individual servers are to be transitioned. For instance, since the sleep inactive state offers a quicker transition back to an active state, the energy-aware server management policy may specify that some servers should be maintained in the sleep state while others can be transitioned into inactive states that offer greater energy savings.

The energy-aware server management policy can use additional factors to decide server transitions. For instance, for repair/maintenance tasks such as software upgrades, an active server can be transitioned to off while another server in an inactive state can be transitioned to active so that the system capacity is unaffected.

The state provisioning module 308 can cause state changes to individual servers consistent with the energy-aware server management policy supplied by policy module 306. Further, the state adjustment module can convey which servers are active to the load dispatcher 202 (FIG. 2) to avoid the load dispatcher sending requests to inactive servers.

Workload Prediction Example

In one implementation, workload prediction can be accomplished utilizing weighted linear regression. In this case, weighted linear regression can be thought of as a form of regression analysis in which observations are represented using a mathematical function of one or more independent variables. For instance, the observations can be dependent variables, such as requests per second. Examples of independent variables can be inputs, such as time. For weighted linear regression, the function can be expressed as a linear combination of regression coefficients. A goal of the weighted linear regression can be to reduce (and potentially minimize) the weighted sum of squares between the observations and the values predicted by the function. The weights are used to assign different importance values to different observations. In summary this particular workload prediction method combines regression analysis with historical trends, long-term models, external knowledge, etc. to predict future workload.

Capacity Provisioning Example

In some particular examples capacity provisioning can be accomplished utilizing machine learning in a performance learning model. In one such case, a capacity provisioning employs the machine learning method of quantile regression in which quantiles of a conditional distribution of a response time are expressed as functions of input workload (requests per second) and number of active servers.

This quantile regression method takes into account the fact the response time grows nearly-linearly when server utilization is low and increases quickly (e.g., potentially exponentially) as the input workload approaches the processing capacity of the servers. In other words, the capacity provisioning method can learn in an offline manner the response time of a system by varying input workload parameters and number of active servers. Then, for a given SLA requirement and an estimate of predicted workload, it computes the number of servers needed to satisfy the workload within the specified SLA.

State Transitioning Example

Figure 4:
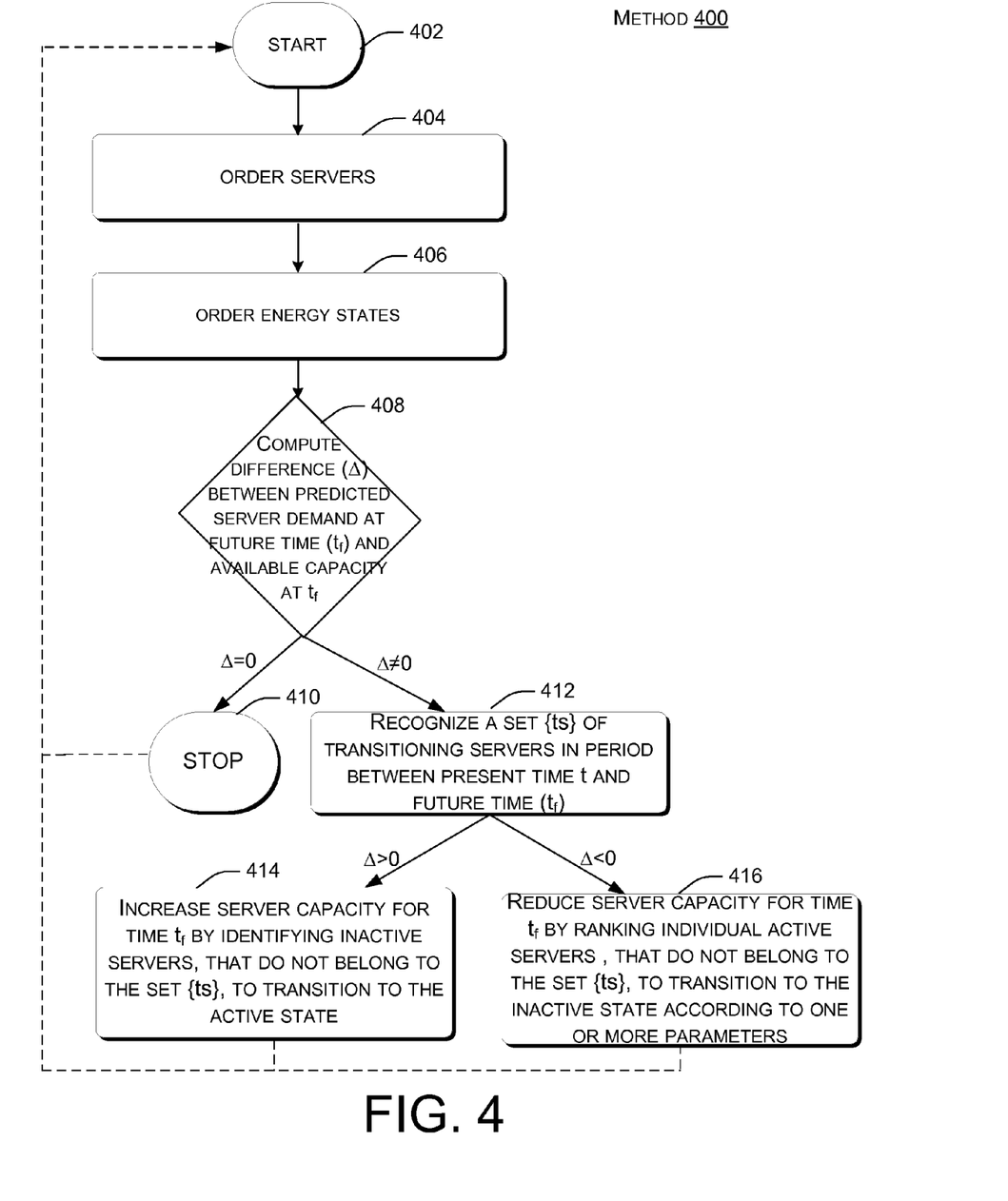
FIGS. 4-5 show flowcharts associated with energy-aware server management methods in accordance with some implementations of the present concepts.

FIG. 4 offers a flowchart of a method 400 for accomplishing state transitioning in accordance with energy-aware server management. Method 400 starts at block 402. At block 404, the method orders servers (i.e., the servers of a server farm or another group of servers). Block 404 can order the servers according to one or more parameters. For instance, the servers can be ordered according to energy state (i.e. active or inactive). Further, inactive servers can be ordered in ranked groups that reflect their relative energy savings. For instance, active servers can be listed followed by inactive servers in the sleep state, then inactive servers in the hibernate state and finally the off state.

Block 406 orders energy states. In one case, the energy states can be ordered based on transition latency between inactive and active states. Alternatively or additionally, energy states can be ordered or ranked based upon their energy use or footprint. So for instance, the energy states can be listed from most energy consumed (i.e., active) to least energy consumed (i.e., off).

Block 408 computes a difference or Δ between a predicted server demand (i.e., workload) at a future time ($t_f$) and an available capacity at time $t_f$. Techniques for predicting workload are described above. To summarize, block 408 serves to identify at some future time whether the available server capacity is just right, too high or too low.

If at block 408, the difference is equal to zero (i.e., the predicted workload equals the future capacity, then the method proceeds to block 410. Block 410 stops the process for controlling servers at the present time since no capacity adjustment is needed. After some incremental time, such as 30 seconds, the method then returns to the start 402 and the method is repeated.

If at block 408, the difference exists (i.e., the difference is not zero), then the method proceeds to block 412.

Block 412 recognizes a set of servers (from the total servers introduced at block 404) that are transitioning states in an interim period between present time t and future time $t_f$. Stated another way, block 412 identifies servers that are transitioning between states and/or are already scheduled to do so. In an instance where the difference of block 408 is a positive value (i.e., Δ>0) then the method proceeds to block 414, otherwise, if the difference is negative (i.e., Δ<0) then the method proceeds to block 416.

At block 414, the method increases server capacity for time $t_f$ by identifying inactive servers to transition to the active state. States of individual servers are listed above at block 404. The inactive servers that are considered for identification do not belong to the set recognized at 412. Stated another way, the identified servers are inactive servers that are not transitioning or scheduled to transition in the interim period.

Various other parameters may be utilized to select the identified servers. For instance, transition latency may be considered. For example, if future time $t_f$ is 30 seconds away, the method can consider transition latencies as a consideration in which servers to transition. For instance, if a transition latency for sleep-to-active is 20 seconds and a transition latency from off-to-active is one minute, then the method may select a server from the sleep state so that the transition is complete at future time $t_f$ (i.e., 30 seconds).

The method can also consider a number of times that individual servers transitioned in a given time period. For instance, if one of the sleep state servers has already transitioned a threshold number of times, then the method may select another sleep state server to transition that is below the threshold. Other parameters can also be utilized in the identification process in a cost benefit analysis. For instance, costs can include a risk of increased response times and decreased server lifespan due to frequent state transitions, among others. Benefits can be decreased energy usage, among others.

Block 416 addresses a scenario where server capacity at future time $t_f$ is greater than the predicted workload. Block 416 reduces server capacity for time $t_f$ by ranking individual active servers to transition to the inactive state. The active servers that are considered do not include those identified in set {ts} at block 412 which may already be transitioning. The active servers can be selected based upon one or more parameters that can be considered utilizing a cost benefit analysis. Examples of parameters are described above relative to block 414. Briefly, if a given server has already transitioned a threshold number of times, then the cost-benefit analysis may be weighed against transitioning that server again. Instead another server can be selected to transition.

Another parameter that can be considered relates to hedging against insufficient capacity. For instance, assume that transitioning a server takes 20 seconds each way and that the process cannot be stopped once it is started. Thus, to get an active server (call it server 1) reactivated once transitioning begins takes 40 seconds (i.e., 20 seconds from active-to-inactive and 20 more seconds from inactive-to-active). Assume for discussion purposes that $t_f$ equals 30 seconds into the future. Now if another inactive server (call it server 2) is available to be transitioned to the active state, then risk associated with transitioning server 1 is relatively low for the first 10 seconds, because server 2 can be activated in time as long as time $t_f$ is at least twenty seconds in the future. So for instance, if a decision is made to inactivate server 1 and eight seconds later underestimation related to time $t_f$ is detected, then server 2 can be activated in time to cover the additional capacity requirement (i.e., eight seconds plus a 20 second transition puts server 2 in the active state at 28 seconds or 2 seconds before the capacity may be inadequate). Thus, the availability of server 2 can tilt the cost-benefit analysis toward inactivating server 1.

Another similar parameter relates to the ability of server 1 itself to cover any underestimation. For instance, continuing the above example, assume that server 1 takes 20 seconds to transition each way for a 40 second active-to-active transition. Consider a first scenario where future time $t_f$ is 30 seconds away. In such a case, server 1 would not be available to cover additional demand at future time $t_f$ if underestimation is detected. In that scenario, this parameter may weigh towards not transitioning server 1. Consider another scenario where future time $t_f$ is 60 seconds away. In such a case, server 1 can be inactivated and reactivated before time $t_f$ (i.e., in 40 seconds) should underestimation be detected. In this scenario, this parameter can weigh towards inactivating server 1. The skilled artisan should recognize that this cost-benefit analysis can consider many parameters to provide expected service levels while conserving energy.

As with block 410, after some incremental time, such as 30 seconds, the method then returns to the start 402 and the method can be repeated.

Algorithm 1 shows a specific state transitioning method that employs cost-benefit analysis to generate part of an energy-aware server management policy.

---

Algorithm 1

Step 0. Order servers according to a sequence in which servers in the active state are ordered before servers in inactive states-- call it SSequence.
   Order energy states in increasing order of transition latencies from that energy state to active state-- call it ESequence.
   Order energy states in increasing order of energy footprint --call it PSequence.
Step 1. Compute the difference between the predicted server demand (say P servers) and the number of servers available at a pre-determined future time-step (say F servers).
(The number of servers available at the pre-determined future time-step depends on the number of servers currently active, the number of servers currently under transition, and the number of servers which are going to be in transition before that pre-determined timestep.)
Step 2. If the difference is zero, stop (call difference = D = P − F).
Step 3. Take first T servers from SSequence and transition them to active state (if not already active or transitioning to active) where T = MINIMUM (P, F). For each i in the T servers, set NoChangeUntilTime[i] := pre-determined future time-step.
Step 4. If D is positive (i.e., add more capacity)
   then
      Take the next (with respect to Step 3) D servers from -continued Algorithm 1

```
SSequence in INCREASING order of ESequence
    For each such server (say s)
set NoChangeUntilTime[s] := pre-determined future time-step
    if (future time-step – current time > transition-from-that-
energy-state-to-active) (i.e., some time still remaining)
        schedule the transition of that server s to active state at
FUTURE time (future timestep – current time)
        else
            schedule the transition of that server s to active state now
        end if
    end for
else
    If D is negative (i.e., lower capacity)
    then
    Take the next (with respect to Step3) D servers in active state
from SSequence and for each such server (say j)
NoTransitionUntilTime[j] <= current time
STEP 4.A.    For each energy state in PSequence
            if (future time-step – current time >= transition-from-that-
energy-state-to-active + transition-from-active-to-that-energy-state)
                schedule D to go to that energy state now; stop
            else if (future time-step – current time >= transition-from-
that-energy-state-to-active)
                AND (there are D number of servers in that energy
state)
                then
                    schedule D to go to that energy state now;stop
                else
                    schedule (D – number of servers in that energy
state) to go to that energy state now
                    D = D – number of servers in that energy state
                    GO TO STEP 4.A (and consider the next energy
state in that order)
                end if
            end for
        end if
    end if
```

To summarize, the capacity provisioning method takes a proactive approach to transition servers into different energy states in order to mask the latency of these transitions and delays transitions so as to reduce energy usage while still meeting load demands.

Second, the implementation applies the transitions while taking into account additional factors such as history of number of transitions per server, hot-spots, repair/maintenance actions, failures, and so on. For example, to balance the number of transitions across nodes, it can put some active servers to low energy states and vice-versa.

Method Example

Figure 5:
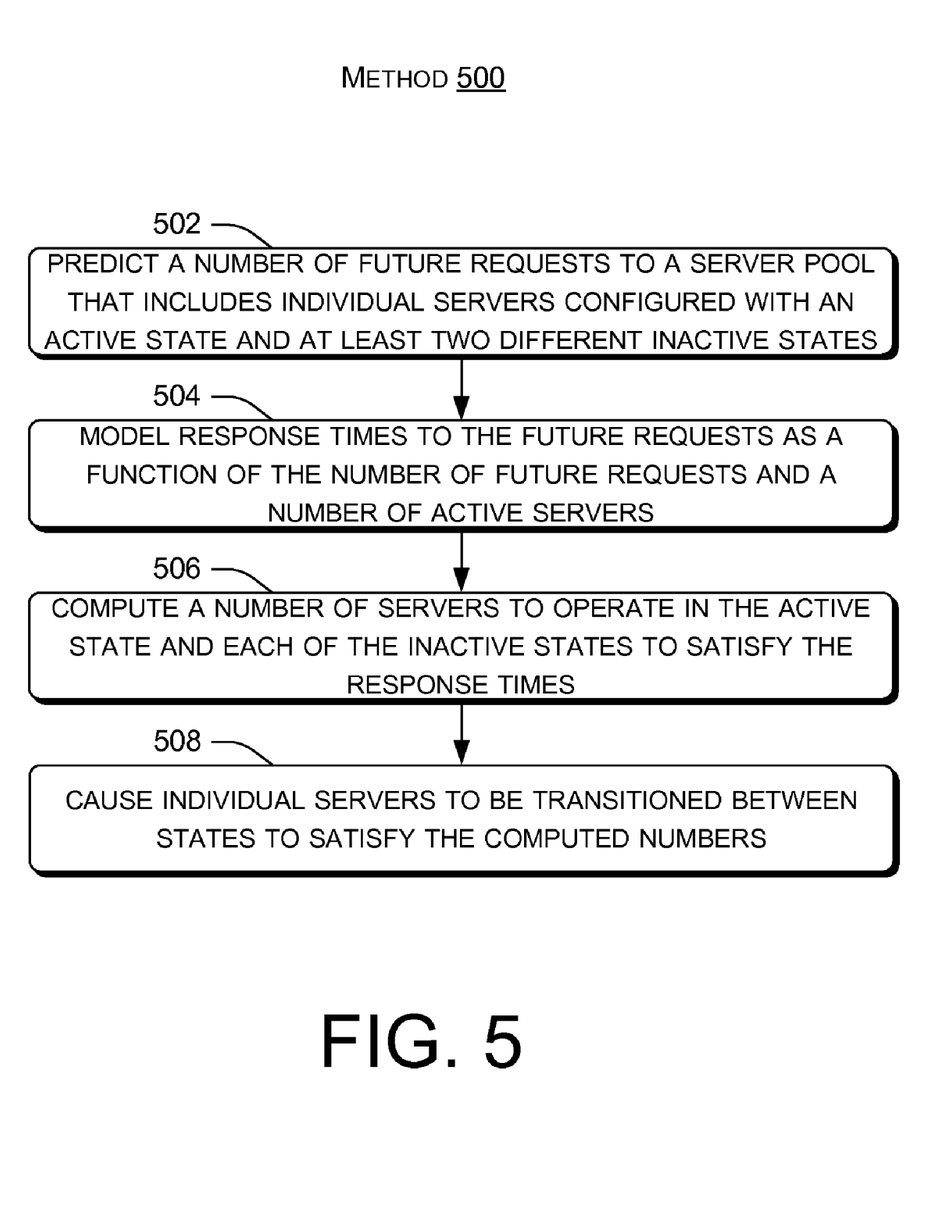

FIG. 5 illustrates a flowchart of a method or technique 500 that is consistent with at least some implementations of the present concepts. The order in which the method 500 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

At block 502, the method predicts a number of future requests to a server pool that includes individual servers configured with an active state and at least two different inactive states.

At block 504, the method models response times to the future requests as a function of the number of future requests and a number of active servers.

At block 506, the method computes a number of servers to operate in the active state and each of the inactive states to satisfy the response times.

At block 508, the method causes individual servers to be transitioned between states to satisfy the computed numbers.

The above described method can satisfy the expectations of the user's (i.e. such as by satisfying terms of an SLA) while reducing energy usage by the servers.

CONCLUSION

Although techniques, methods, devices, systems, etc., pertaining to energy-aware server management are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-readable storage media having instructions stored thereon that when executed by a computing device cause the computing device to perform acts, comprising:
   predicting a number of future requests to a server pool that includes a plurality of servers configured with an active state and at least two different inactive states;
   modeling response times to the future requests as a function of the number of future requests and a number of active servers in the server pool, the response times being modeled using a distribution of times for the server pool to process and respond to the future requests;
   computing a number of servers to operate in the active state and each of the inactive states to maintain the response times at a predefined level; and,
   causing individual servers to be transitioned between states to satisfy the computed number of servers.

2. The computer-readable storage media of claim 1, wherein the predicting is based upon analyzing relatively short term trends, relatively long term models, present trends or external knowledge.

3. The computer-readable storage media of claim 1, wherein the predicting comprises predicting the number as well as size and content of individual future requests.

4. The computer-readable storage media of claim 1, wherein the computing considers ramifications of state transitions on a lifespan of individual servers.

5. The computer-readable storage media of claim 1, wherein the computing considers both transition latency periods between individual inactive states and the active state and energy savings associated with individual inactive states.

6. The computer-readable storage media of claim 1, wherein the causing comprises sending a signal to individual servers to cause state transitions among the active state and the at least two different inactive states.

7. A method comprising:
   predicting a number of future requests to a server pool that includes a plurality of servers configured with an active state and at least two different inactive states;
   modeling response times to the future requests as a function of the number of future requests and a number of active servers in the server pool, the response times being modeled using a distribution of times for the server pool to process and respond to the future requests;
   computing a number of servers to operate in the active state and each of the inactive states to maintain the response times at a predefined level; and, causing individual servers to be transitioned between states to satisfy the computed number of servers, wherein at least one of the predicting, the modeling, the computing, or the causing are performed by a computing device.

8. The method of claim 7, wherein the predicting is based upon analyzing relatively short term trends, relatively long term models, present trends or external knowledge.

9. The method of claim 7, wherein the predicting comprises predicting the number as well as size and content of individual future requests.

10. The method of claim 7, wherein the computing considers ramifications of state transitions on a lifespan of individual servers.

11. The method of claim 7, wherein the computing considers both transition latency periods between individual inactive states and the active state and energy savings associated with individual inactive states.

12. The method of claim 7, wherein the causing comprises sending a signal to individual servers to cause state transitions among the active state and the at least two different inactive states.

13. A system, comprising:
an adaptive control unit configured to:
predict a number of future requests to a server pool that includes a plurality of servers configured with an active state and at least two different inactive states;
model response times to the future requests as a function of the number of future requests and a number of active servers in the server pool, the response times being modeled using a distribution of times for the server pool to process and respond to the future requests;
compute a number of servers to operate in the active state and each of the inactive states to maintain the response times at a predefined level; and,
cause individual servers to be transitioned between states to satisfy the computed number of servers, and
a computing device configured to execute the adaptive control unit.

14. The system of claim 13, wherein the adaptive control unit is configured to predict the number of future requests by analyzing relatively short term trends, relatively long term models, present trends or external knowledge.

15. The system of claim 13, wherein the adaptive control unit is configured to predict the number as well as size and content of individual future requests.

16. The system of claim 13, wherein the adaptive control unit is configured to compute the number of servers by considering ramifications of state transitions on a lifespan of individual servers.

17. The system of claim 13, wherein the adaptive control unit is configured to compute the number of servers by considering both transition latency periods between individual inactive states and the active state and energy savings associated with individual inactive states.

18. The system of claim 13, wherein the adaptive control unit is configured to cause the individual servers to be transitioned by sending a signal to the individual servers to cause state transitions among the active state and the at least two different inactive states.

* * * * *